United States Patent [19]
Garst

[11] 3,824,387
[45] July 16, 1974

[54] METHOD AND APPARATUS FOR CONTROL OF CONDITIONS IN A PROCESS

[75] Inventor: John M. Garst, Blacklick, Ohio

[73] Assignee: Owens-Corning Fiberglass Corporation, Toledo, Ohio

[22] Filed: Jan. 3, 1972

[21] Appl. No.: 215,048

[52] U.S. Cl........ 235/151.1, 65/DIG. 13, 235/150.1, 340/413
[51] Int. Cl. ......................................... G06f 15/46
[58] Field of Search.......... 65/2, 9, 11 R, 11 W, 29, 65/160–164, DIG. 13; 235/150.1, 151.1, 151, 151.3; 340/172.5, 147 R, 409, 412, 413; 318/562, 565, 636; 328/151

[56] References Cited
UNITED STATES PATENTS

| | | | |
|---|---|---|---|
| 3,334,334 | 8/1967 | Halpin | 2/151.1 |
| 3,351,910 | 11/1967 | Miller et al. | 340/172.5 |
| 3,517,125 | 6/1970 | Peterson et al. | 340/412 X |
| 3,539,316 | 11/1970 | Trethewey | 65/2 |
| 3,611,363 | 8/1971 | McCrea et al. | 340/413 |
| 3,662,242 | 5/1972 | Wacker et al. | 235/150.1 UX |

Primary Examiner—Joseph F. Ruggiero
Attorney, Agent, or Firm—Staelin & Overman and Myron E. Click

[57] ABSTRACT

An embodiment described herein comprises apparatus for manufacturing a glass fiber mat which includes means for providing glass fibers at a deposition station, movable collecting surface means arranged to receive fibers at the deposition station, means for depositing glass fibers along the collecting surface including means for driving the movable collecting surface past the deposition station, and data processing means for controlling the variables of the glass fiber providing and depositing means to provide a mat-like mass of fibers on a collecting surface with predetermined uniform characteristics. A plurality of control loops provide data on the actual condition of each variable being monitored and controlled. The data supplied by each control loop is scanned by a scanning means having a plurality of selectable different scanning rates. The scanned actual condition data of each control loop is compared with setpoint data representing a desired condition for the variable of that loop. A selection means is responsive to the comparing means and selects a first slower scanning rate for at least one of the control loops in response to substantial agreement between actual and setpoint data in the comparing means. In response to a predetermined difference in the comparing means between actual and setpoint data of the one control loop a second faster scanning rate for the scanning means is selected for the one control loop.

28 Claims, 6 Drawing Figures

3,824,387

METHOD AND APPARATUS FOR CONTROL OF CONDITIONS IN A PROCESS

BACKGROUND OF THE INVENTION

As the instrumentation approach in measurement and control of variables, apparatus and processes, has grown more sophisticated, it has become possible to completely automate various production lines so that better quality and more quantity may result. However, in production processes where variables are interrelated and where the interrelation changes when a different type of the same product is produced on the same production line, it is necessary to solve a number of problems in order to satisfactorily relinquish control of the production line to instrumentation. For example, where a production line is to be adapted for a large number of fibrous structure products of different densities, widths, and lengths, not only must the important variables be adjusted when starting to make these different products, but it is necessary to interrelate variables in order to insure that quality of the product is maintained and improved as well as improving the efficiency of the production line output. Such an improved system is described in copending application Ser. No. 215,047, filed Jan. 3, 1972, and assigned to the same assignee as the present invention.

When a glass furnace, a plurality of bushing feeders, or any other process is controlled by a data processing means such as a computer, it is necessary to sense the actual status of each of the conditions in the process and through the use of the data processing means provide corrective signals for controlling each condition. The sensing or sampling of the actual status of the various conditions is generally accomplished at various times which are not in sequence. Further, the polling or samplings for each condition may have different time spacings. When computer control was initiated it was necessary to take more readings because of the different relationships in the spacings between the input or sensing signals, thus requiring additional data processing capacity in order to take sensing signals or inputs at the desired time intervals and perform the correcting signal operations on a continuing basis. Data processing equipment generally has count periods representing the smallest time spacing between possible computer operations. To utilize the computer most efficiently each count period should be used for performing a sampling or control operation or other tasks.

If the data processing equipment in use has 100 channels it is obvious that it could control 100 loops. That is, a control loop could be assigned to each channel without regard to the time spacing or scan time between samplings or control operation of an individual loop. It was then desirable to select and coordinate loops having spaced scan times to that a plurality of loops might be controlled by each channel, preferably wasting as few of the count periods for that channel as possible. That is, a number of loops with spaced scan times were sequenced with respect to each other so that as many of the count periods of the data processing equipment were used as possible. This improvement is described in greater detail in U.S. Pat. No. 3,557,349, issued Jan. 19, 1971.

In the control of continuous process operations, such as the manufacture of glass fiber mats, there are normally a number of devices utilized in the process that tend to stay in the position or condition desired for the product being manufactured. In mat production these devices include controls for the width of the strand distribution, the hood width setting to confine the deposition of the fibers to a desired mat width, trim saws for removing unfinished edges or for obtaining an exact desired width of the finished mat, etc. Because the conditions of these devices tend not to drift under ordinary circumstances there is little need for the data processing apparatus to check the control loops which monitor and correct these devices during every program cycle. Thus, data processing apparatus or computer time has been wasted in the past in monitoring various process devices more frequently than necessary.

Accordingly, it is an object of this invention to provide an improved method and apparatus for forming fibrous structures.

It is a further object of this invention to provide an improved method and apparatus for forming fibrous structures which includes means for adapting data processing control apparatus for the most efficient use of its available control time.

It is a further object of this invention to provide an improved method and apparatus for applying a variable scan algorithm to allow data processing apparatus to check control loops only periodically instead of during every program cycle, to free the computer to do other tasks.

An additional object of this invention is to provide an improved method and apparatus for programming data processing apparatus to provide a variable scan algorithm, as noted in the preceding paragraph, which allows the computer to accept an interruption at any time. Thus, if there is a job change or if a normally stationary device moves out of a desired position, the computer begins checking that control loop every program cycle until the job change is complete or the device is back in the correct position, thus enabling accurate control of the devices while requiring less computer time.

A still further additional object is to provide an improved method and apparatus for programming data process apparatus to provide better control stability and computer efficiency by enabling a control loop to be scanned at a fast scan rate when a change or alarm condition exists and at a slow scan rate when no control action is required thus utilizing less computer time and providing a more stable setting between changes.

SUMMARY OF THE INVENTION

The above objects and features of this invention have been illustrated herein in preferred embodiments of apparatus for manufacturing glass fiber mats. Although the invention is herein exemplified in specific detail by reference to glass fiber production, it will be apparent in view of the disclosure that it has application to production of other fibers or of other mat materials as well. Further, although the variable conditions shown as subjects of measurement and control are specific uses of the invention herein disclosed, it is to be noted that all embodiments are illustrative only and not limiting in any sense with the respective apparatus, process, product or other use of the invention as disclosed herein.

The invention thus features method and apparatus for controlling a variable which comprises a control loop means for a variable including means for providing data on the actual condition of the variable, and data processing means for monitoring the control loop and providing corrective signals therefor. The data processing means includes first means for scanning the data supplied by the control loop means at a plurality of selectable different scanning rates. The scanned actual condition data from the control loop is compared with data representing a desired condition for the variable. Second means responsive to a predetermined difference in the comparing means between actual and desired conditions of the variable increases the scanning rate of the scanning means from a first rate to a second rate which is faster than the first scanning rate. When the variable requires very exacting control the predetermined difference is very small or may even be zero. Other variables may permit the use of relatively substantial tolerances.

The second means is further responsive to a correction of the variable to a desired condition to decrease the scanning rate of the scanning means to a scanning rate which is slower than the second scanning rate mentioned. The second means may be made responsive to a requirement that a predetermined plurality of consecutive indications of correction of the variable to its desired condition before the decrease of the scanning rate of the scanning means to a scanning rate which is slower than the second scan rate mentioned.

Timing means may be utilized which is actuatable in response to the initiation of supplying of variable correction data to the control loop, in the embodiment herein this being sensed when an error signal is supplied to the calculation section of a computer for the calculation of a correction signal. The second means in this instance is further responsive to the timing means after the elapse of a timing period to decrease the scanning rate of the scanning means from the mentioned second rate to a scanning rate which is slower. The timing means may further include means for adjusting the length of the timing period. The timing adjusting means may be made responsive to a program change sensing means to adjust the length of the timing period to be proportional to the difference between actual and desired conditions of the variable.

First alarm means may be provided which is responsive to the timing means and the variable condition data comparing means. The first alarm means is actuatable in response to a coincidence of the elapse of the timing period and to a predetermined difference in the comparing means between the actual and desired conditions of the variable, which notes that the desired correction has not yet been effected.

More specifically, means may be provided for changing the setpoint data in the comparing means which represents a desired condition of the variable. The abovementioned second means is then further responsive to the data changing means to increase the scanning rate from the first rate to the second rate when the desired condition data or setpoint is changed.

The timing means may then be made actuatable for a timing period in response to the changing of the desired conditions or setpoint data in the comparing means. The second means is then responsive to the timing means after the elapse of the timing period to decrease the scanning rate of the scanning means from the second rate to a scanning rate which is slower. As noted, the timing means may include means responsive to the magnitude of the desired condition data or setpoint change in the comparing means for adjusting the length of the timing period to be proportional to the magnitude of the change in the setpoint.

In this instance the alarm means is actuatable in response to an elapse of a timing period of the timing means and to the continuing predetermined difference in the comparing means between the scanned actual condition and the new setpoint or desired position data in the comparing means.

Second alarm means may be provided which is actuatable in response only to the predetermined difference in the comparing means between actual and desired conditions of the variable. The operation of the second alarm means may be inhibited in response to actuation of the first-mentioned alarm means.

As an alternative, alarm means may be provided which is actuatable only in response to the appearance of the predetermined difference between actual and desired condition data in the comparing means.

Other objects, advantages, and features of this invention will become apparent when the following description is taken in conjunction with the accompanying drawings, in which.

Figure 4:
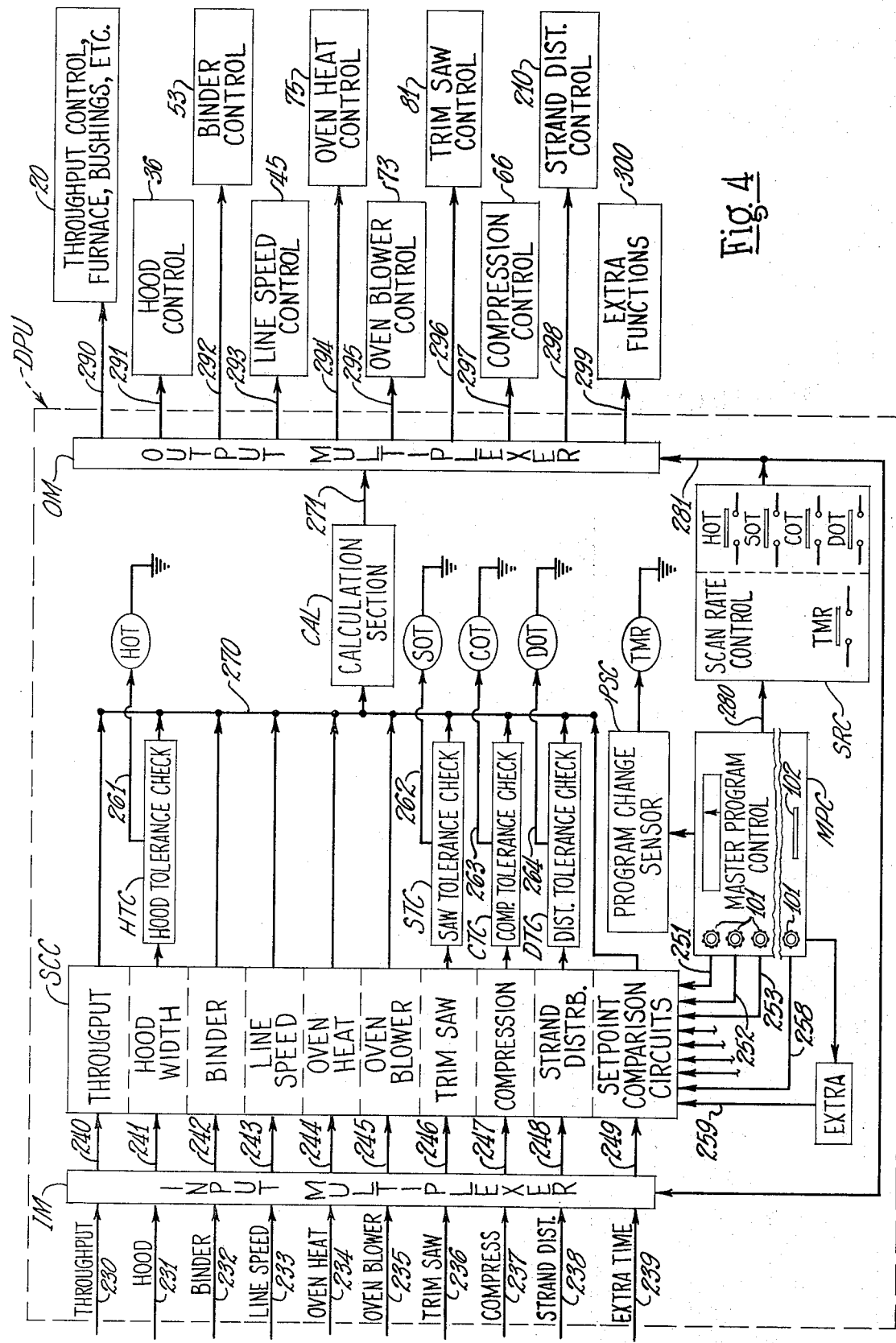
FIG. 4 is a block diagram layout illustrating a plurality of control loops useful with the apparatus illustrated in FIGS. 1 through 3, in which data processing apparatus is controlling the continuous production.
Figure 5:
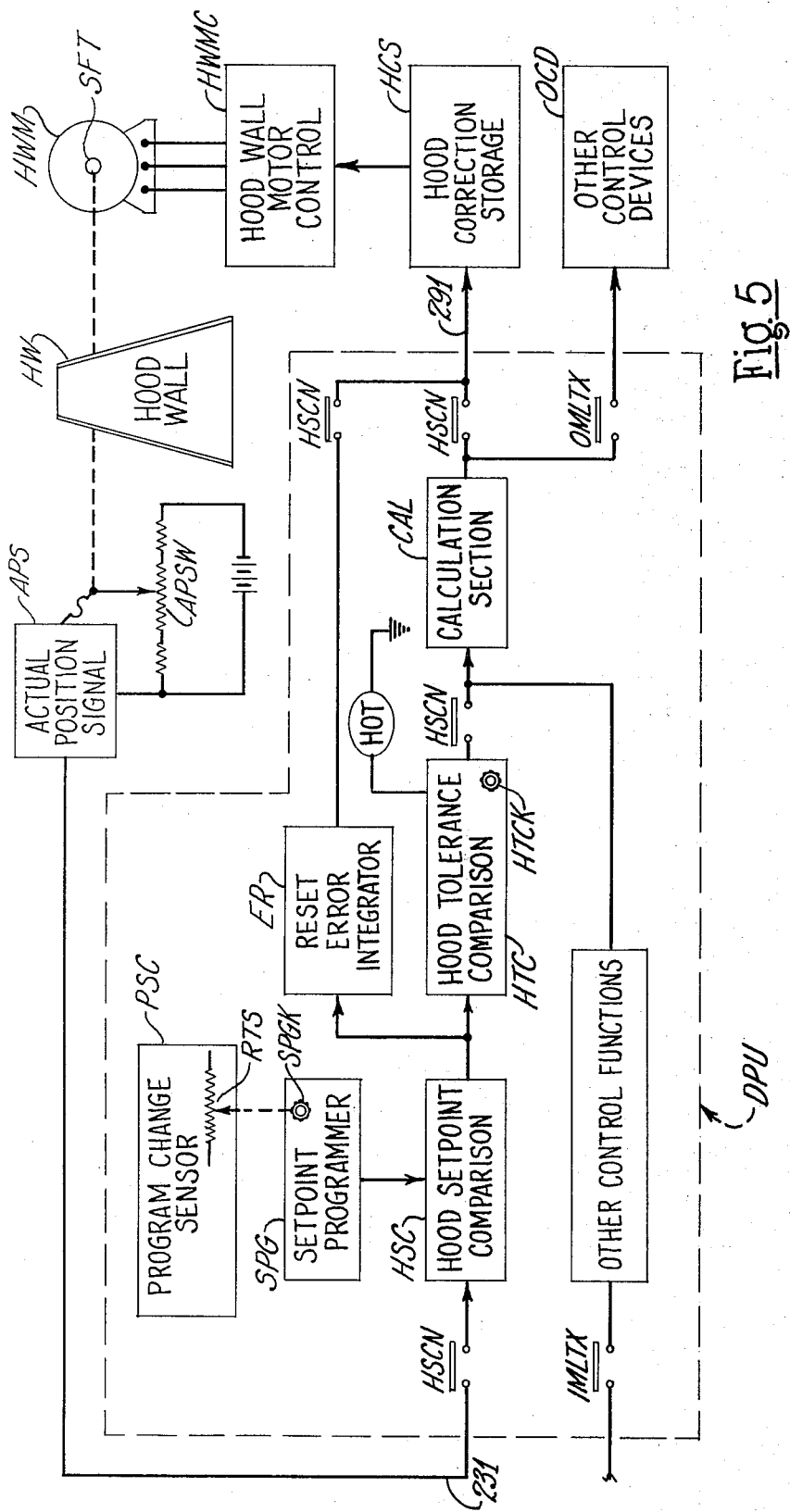
Figure 6:
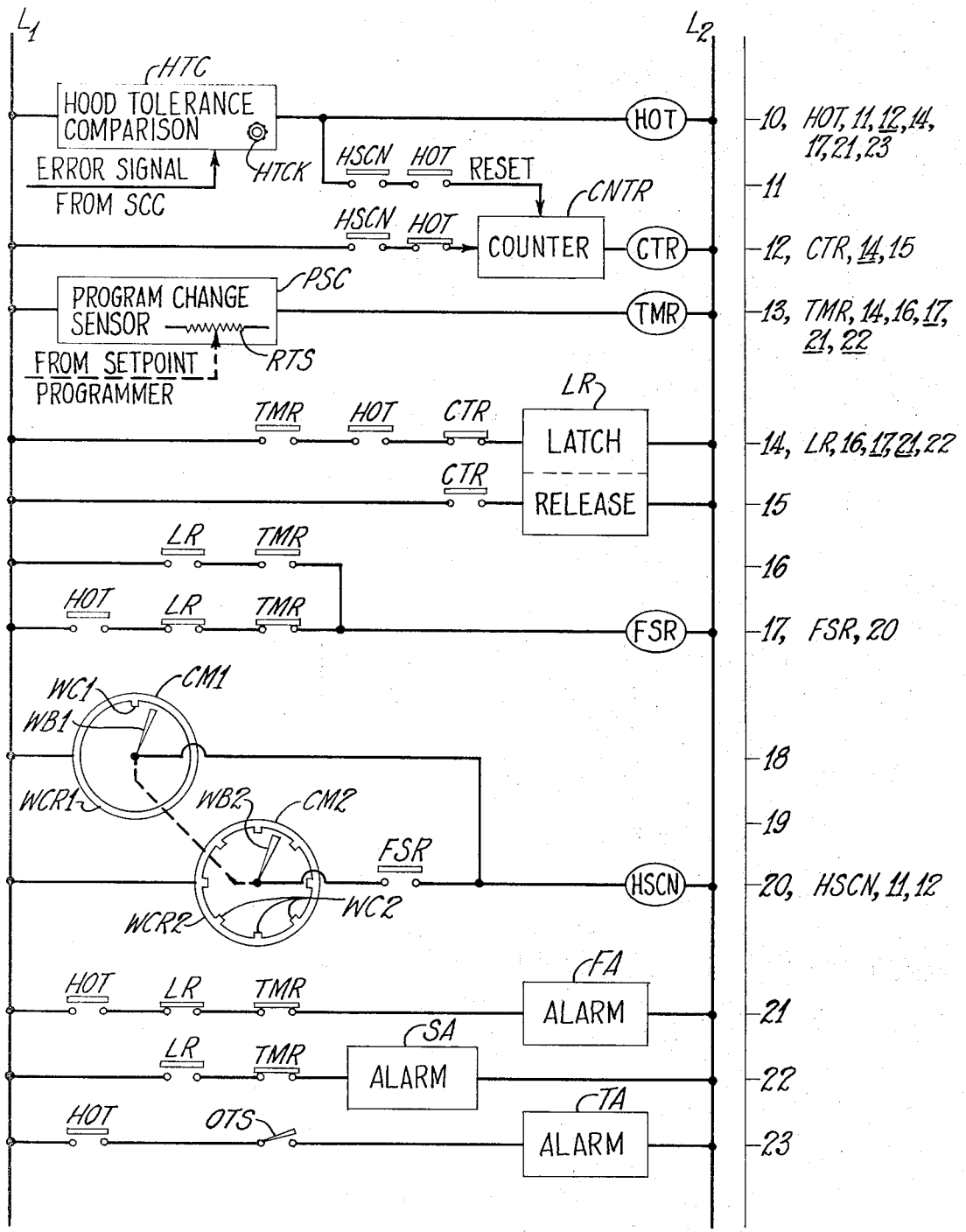

FIG. 5 is a block diagram layout in more specific detail of one of the control loops illustrated in FIG. 4 and a more detailed representation of the data processing apparatus sampling and correcting the illustrative control loop; and FIG. 6 is a schematic representation of control circuitry useful with the apparatus illustrated in FIGS. 4 and 5 wherein the variable scanning and alarm features are illustrated.

DESCRIPTION OF THE PREFERRED EMBODIMENTS

Figure 1:
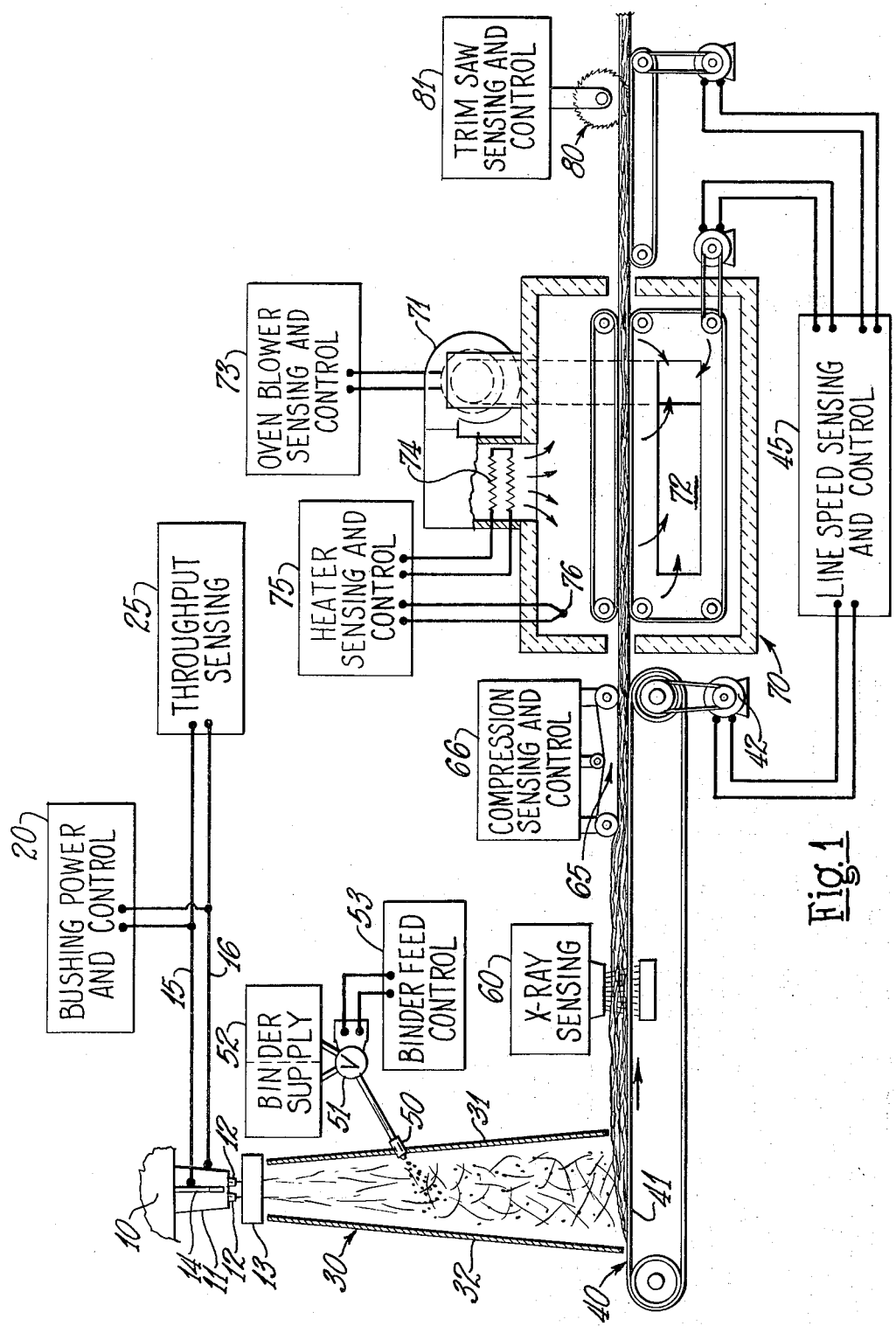
FIG. 1 is a semi-diagrammatic view of a production line embodying the teachings of this invention.

Referring to FIG. 1 there is illustrated a production line for the manufacturing of fibrous structures such as insulating wool mats, bats or the like. A molten heat-softenable material such as glass may be supplied by a forehearth 10 to a feeder or bushing structure 11 having tipped orifices 12 formed in the bottom thereof to provide streams of the molten material for attenuation into fibers. Electrical terminals 14 on each end of the feeder or bushing 11 are connected via power lines 15 and 16 to a bushing power supply and control 20. The control 20 is operative to supply current to the terminals 14 which is translated into heat flowing through the bushing or feeder 11 in an amount sufficient to maintain the molten material within feeder 11 at a desired attenuating temperature.

Figure 3:
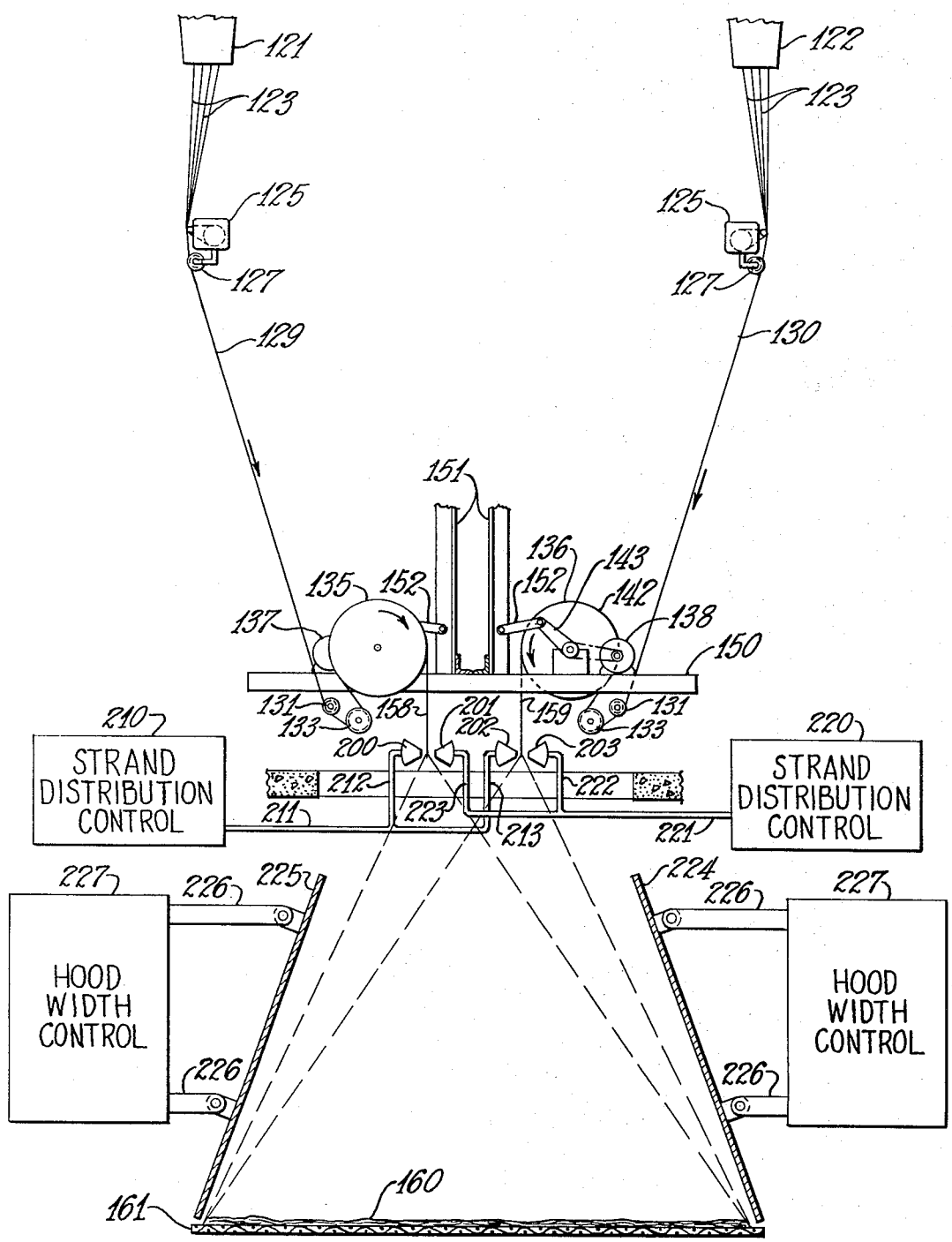
FIG. 3 is a semi-diagrammatic view of an alternative embodiment of a fiber deposition station for the formation of a mat-like mass of fibers.

While other attenuating means may be utilized as will be illustrated in FIG. 3, there is shown in FIG. 1 a blower 13 for directing gaseous blasts of steam or other gases at the streams issuing from orifices 12 to attenuate the streams into fibers which are received by a movable collecting surface means generally indicated at 40. The movable collecting surface means 40 in this instance comprises an endless belt 41, preferably of a foraminous material so that a suction may be applied beneath the belt to guide and attract the fibers to the belt and hold them in their deposited position. The endless belt is mounted on conveyor rollers which are driven by conveyor drive means 42.

Figure 2:
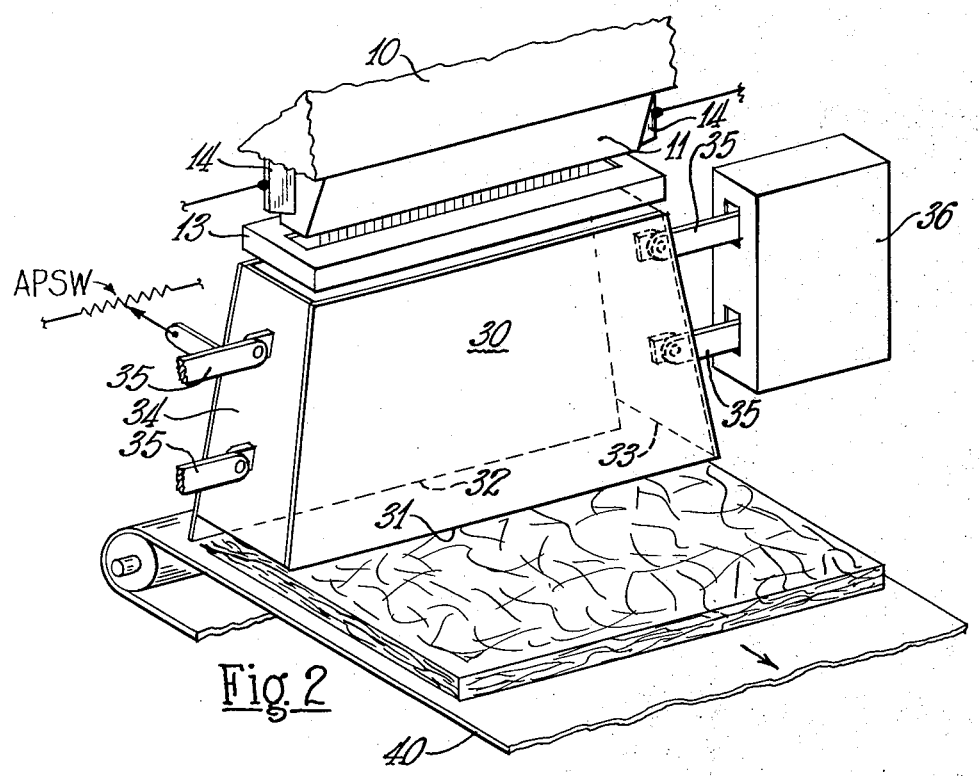
FIG. 2 is a view in perspective of an adjustable hood to control fiber deposition width on a conveyor.

A hood or shield means is generally indicated at 30 and is adapted to confine the deposition of the attenuated fibers within a predetermined area on the collecting surface. Referring to FIG. 2 it will be seen that the hood means 30 comprises a front wall 31, a rear wall 32, and side walls 33, 34. The side walls 33 and 34 are each connected via one or more arms 35 to a width control mechanism 36. The side walls 33 and 34 may thus be moved inwardly and outwardly to determine the width of the deposition of fibers on the collecting surface of the conveyor belt 41. The width adjustment control 36 may comprise a suitable mechanical linkage, e.g., a rack and pinion arrangement driven by a motor means which is responsive to a signal from a master control to set the side walls 33 and 34 at the desired width.

One or more binder dispensing means 50 are disposed to dispense a binder or other additional component in the fibers being collected on conveyor 41. The binder dispensing means may be connected via a flow control means such as a valve 51 to a supply of binder 52. The flow of binder through the valve 51 may be electrically controlled by a binder feeder control 53. Although the additional component being supplied to the fibrous mat deposited on the conveyor surface 41 is shown in the drawings as binder, it should be noted that other components may be added to the mat in addition to or instead of a binder. For example, if the mat being formed is to be utilized in filter applications, it may be desirable to intersperse in the mat a collecting compound such as an oil which will cause dust or dirt particles in the air to adhere to the otherwise relatively soooth glass fibers which are integrated into a filter mat.

Means for measuring the actual deposition in terms of weight per unit area may be provided for checking, comparing and sounding an alarm, if a tolerance is exceeded, or modifying one or more of the variables involved. An X-ray sensing means 60 is suitable for such purpose. When a beam of X-rays is shot through the mat-like mass of fibers a measuring device indicates how much X-radiation is absorbed. Thus the X-ray sensing means may be set to measure the quantity of fiber per unit area and/or the quantity of binder or additional component with the fibers in the mat-like mass on the collecting conveyor 41. The X-ray sensing may provide corrective signals for the line speed control 45, the binder feed control 53, the fiber attenuation blower 13, the strand distribution controls 210, 220 in FIG. 3, and be a back-up sensor for the throughput sensing device 25 to modify the effect of the bushing power control 20 or upstream batch feeding and furnace melting conditions.

In the manufacture of a majority of the fiber structures or mats some degree of compression is desirable or necessary. Accordingly, compression roller means 65 are illustrated which are operative to compress the mat-like mass to the desired thickness. The compression roller means 65 is controlled by compression sensing and control unit 66 to adjust the compression to the amount desired. Compression of the mat or other structure may occur prior to or during a curing process for the binder or both.

An oven means 70 is illustrated for curing the binder or otherwise heat treating the additional components added via the dispenser 50. Ducts 71 and 72 are connected to circulate a gas, usually air, through foraminous oven conveyors and thus through the combined mass of binder and fibers. If heat is desired the air or gas being circulated is heated by heater 74 controlled by heater control 75 which is responsive to a thermocouple or other heat sensing means 76 disposed within the oven 70. An oven blower drive 73 senses and controls the amount of air being circulated through the fibrous structure.

It is desirable in some instances to trim the edges of the fibrous structure either to a desired width or to remove rough edges to present a smooth appearance. Trim saw means 80 is illustrated for accomplishing the triming, the width and the speed of the trim being sensed and controlled by the trim saw control 81.

Referring to FIG. 3 there is illustrated an alternative fiber providing apparatus for manufacturing a mat made up of continuous strands containing a plurality of filaments. The apparatus in FIG. 3 includes molten glass feeding bushings 121 and 122 depending from conventional glass melting tanks which are not illustrated. Continuous filaments 123 are drawn from the minute streams of molten glass issuing from orifices of the bushings.

A size or a lubricant is applied to the filaments as they pass over the traveling belt or apron of conventional size applicators 125. The size may be merely water to reduce friction between the filaments as they are subsequently joined together in strand form. A more complex size or binder may be desired to promote coherence of the filaments when combined as strands, and adherence of the strands or filaments to the surfaces of the pulling wheel. Where a mat is to be produced, and the mat is to be ultimately combined with a plastic resin, it may also be desirable to include a coupling agent in the size which facilitates wetting of the mat by the resin.

The filaments from each bushing, after sizing, are grouped together to form a set or group of strands, the strands being individually segragated as they travel within grooves over the respective gathering shoes 127 to second gathering or aligning shoes 131.

From the shoes 131 the two sets of spaced strands 129 and 130 are led around the two idler wheels 133 and travel around the pull wheels 135 and 136. These wheels are similarly constructed but are relatively reversed in position and are on opposite sides of the center line of the receiving conveyor 161.

Motors 137 and 138, respectively, drive pull wheels 135 and 136. The strands carried by pull wheel 135 are released therefrom by the successive projection of fingers of an oscillating spoke wheel through slots in a peripheral surface of the pull wheel 135. Similarly, fingers of another spoked wheel serve this purpose in connection with the pull wheel 136. The strands are kinetically projected in tangential paths from the pull wheels. That is, the rotation of the pull wheels 135, 136 at high speeds imparts kinetic energy to each segment of the strand as it is pushed off the wheel. The strand segments are all pushed off tangentially in the same direction downwardly in the apparatus of FIG. 3.

The rear side of each pull wheel is covered by an independently mounted, oscillatable back plate on which the associated spoked wheel is carried. The back plate 142 of the assembly including the pull wheel 136 may be arcuately oscillated by movement of the arm 143. The entire assembly may be positioned on the platform 150 to support the pull wheels 135 and 136 and the equipment associated therewith. The platform 150 may be suspended by angle iron hangers 151. The arm 143 may be arcuately turned to a position to determine the tangential push-off of the strand from the pull wheel 136. If, as in this instance, it is desired that the tangential push-off causes the strand to be carried perpendicularly downwardly with their linear velocity, then the arm 143 may be secured to hanger 151 by a link 152 to retain the strand push-off at the position desired.

The group of strands 158 thrown down by the pull wheel 135, which has its push-off point also anchored by a link 152 connected to hanger 151, and the group of strands 159 thrown down by the pull wheel 136 are accumulated, after distribution, in mat form 160 upon the collection surface 161.

After the sets of strands 158 and 159 have had imparted thereto kinetic energy and thus provided with a predetermined linear velocity, aerodynamic diversion means, in this instance fluid nozzle means 200, 201 and 202, 203 for the strand sets 158 and 159, respectively, distribute the strands across the width of the collecting surface 161.

With the high peripheral speed of the pull wheel, the strands are forcefully projected in straight tangential lines from the point of disengagement effected by the fingers of the spoke wheel. The kinetic energy that the strands acquire carries them in straight courses to the region of application of aerodynamic diversion to acquire a new line of travel to the desired point on the collecting surface.

The fluid nozzles 200 through 203 and the strand distribution apparatus illustrated in FIG. 3 are described in greater detail in U.S. application Ser. No. 037,437, filed Mar. 14, 1970, and assigned to the same assignee as this application. The disclosure in the aforementioned application is included herein by reference thereto.

In the apparatus shown in FIG. 3, opposing aerodynamic means 200, 201 and 202, 203 are used for distribution. A fluid nozzle means is disposed on each side of the plane defined by the set of strands 158 or 159 leaving pull wheels 135, 136. The fluid pressures for each nozzle may be changed to vary the effect of aerodynamic diversion and thus the distribution of the strands. That is, the fluid pressures of one or both of the nozzles may be changed to obtain a sweeping distribution and, if desired, an overlap of distribution of one or more adjacent strands. This may be accomplished by the use of electrically controlled valves in the strand distribution control units 210, 220. An air supply line 211 may be connected via branch conduits 212, 213 to fluid nozzles 200, 202. An air supply line 221, may be connected from control unit 220 via branch conduits 222, 223 to fluid nozzles 203, 201. The strand distribution control units 210, 220 modulate the flow of air through the conduit 211, 221 to cause a regulated sweeping distribution of the strands across the surface 161, as noted by the dotted lines between the nozzles and the collecting surface 161 to obtain distribution of the mat 160 across the desired width of the conveyor.

The width of the mat deposited may be regulated and varied by changing the amount of air pressure supplied by the unit 210, 220 to the conduits 211, 221. The width of the mat deposited may be also regulated by the hood width control unit 227, similar to those described in FIG. 2, which through arms 226 connected to hood walls 224, 225 regulate the area above the collecting surface in which strands may be deposited or collected to form a mat-like mass.

It should be further noted that distribution of the strands back and forth across the collecting surface 161 may be accomplished by a controlled arcuate oscillation of the arms 143 by mechanisms which are known in the art. This type of strand distribution is useful for certain applications and does not require the aerodynamic distribution by the fluid nozzles.

Referring to FIG. 4 there is illustrated, in block diagram form, control apparatus embodying the teachings of this invention as applicable to the apparatus illustrated in FIGS. 1 through 3. A plurality of control loops having input leads 230 through 239 provide data on the actual condition of the plurality of variables being controlled to a data processing unit indicated generally at DPU with the dotted line enclosing components of the data processing unit. A plurality of output or control signals from the data processing unit DPU are provided on output leads 290 through 299 to the variables being controlled. The variables being controlled and shown in the drawings are only illustrative of the many control functions exercised by a data processing unit in automatically controlling a continuous production line such as the glass fiber mat manufacturing line illustrated in FIG. 1.

A master program control unit MPC is illustrated as part of the data processing unit DPU and is adapted to receive program input in the form of a punched card which may be placed in slot 102 and read in the usual manner, by manual settings chosen and programmed in the machine by setting control dials or knobs 101, or in any other suitable way such as electromagnetic tape or other devices for reading settings or a computer program to a control. The input to the master control MPC provides information as to the width, thickness, density, types of binder, curing information, and other information for variables as required to make the desired product. Master control MPC may be adapted to provide output signals along leads 251 through 259 to provide a precalculated setpoint for each of the variables involved. The setpoints supplied to the setpoint comparison circuit SCC thus provides data which is indicative or representative of the desired condition of the variable being controlled.

For some variables there is little or no modification of the condition of the variable once the setpoint provided by the master control MPC has been compared with the actual condition data and the variable has been changed to the desired condition. For example, the hood width setting will seldom require modification by the adjustment means 36 in FIG. 2 for the walls 33 and 34 of the hood 30 after a job change has been completed. Similarly, it is unlikely that the compression control 66 or the trim saw control 81 will make modifications once a particular job change has been programmed into the data processing equipment and the job is in production. Some drifts may occur in these and other variables being controlled, however, and since they are important variables it is desirable to monitor those controls. Therefore, the master program control MPC supplies an output or outputs on lead 280 to a scan rate control SRC which in turn supplies outputs on leads 281 to an input multiplexer IM and to an output multiplexer OM so that all of the control loops may be monitored and correction applied if required.

A primary variable in most instances will be the throughput of the melter-feeder-attenuating mechanism which will result in a particular rate of deposition of fibers upon the collecting surface. Throughput may be sensed by unit 25 in FIG. 1 and supplies an input on lead 230 through the input multiplexer IM and on lead 240 to a throughput setpoint comparison circuit. If there is a difference between the data representing the actual condition of the throughput and the data representing the desired or setpoint condition of the throughput a signal will be presented to lead 270 to the calculations section CAL which will provide a corrective signal on lead 271 to the output multiplexer OM. The output multiplexer OM will connect the corrective signal through lead 290 to the throughput control unit 20 to modify the batch input to the furnace, the melting rate, the attenuation rate, the bushing heat, and other variables which affect the throughput of the system and the rate of deposition of the fibers on the collecting surface 41.

Assuming that there is no alteration in the primary variable the operation will proceed on the basis of the preselected settings provided by the master control MPC. That is, a predetermined throughput of fibers or rate of deposition of fibers on a collecting surface 41 will require the preselected amount of binder or additional component to be added by dispenser 50 as controlled by binder feed control 53. Further, the collecting surface will be driven past the fiber deposition station at a rate of line speed selected by and set into the line speed or conveyor speed control 45. The oven heater control 75 will insure that the preselected amount of heat will be furnished by heater 74 and that the air so heated will be circulated at a volume as preselected and set into the oven blower drive 73. Since the line speed of the conveyor or collecting surface wwll not be varied within a particular job change, the rotation of the trim saw 80 will need be maintained at only a certain speed.

The above variables will be controlled by the scanning or sensing of the actual condition of the variables, the comparison with that variable's setpoint in the setpoint comparison circuit SCC, and the output of correction signals from the calculation section CAL through the input and output multiplexers as described hereinbefore with respect to the control of the throughput.

While a number of the variables involved in any process will require continuous monitoring and correction if necessary, such as a primary variable as the throughput control, a number of variables need not be checked as frequently as noted hereinbefore. These variables may include devices which are set as the initial job change program is fed into the master program control MPC and will vary or drift little after that setting is achieved.

To illustrate this invention the setting of the hood width, the trim saw, the compression rollers, and the strand distribution (if the fiber providing apparatus of FIG. 3 is utilized) are chosen as variables which will need monitoring only on occasion. These variables may be controlled by mechanical devices which may have some play in the mechanical linkage, so a larger tolerance may be allowed in sensing the final setting than might be permitted otherwise. For such variables any error signal from the setpoint comparison circuit may advantageously feed to a tolerance check circuit to see if that error signal exceeds the tolerance permitted for the device being controlled. A hood tolerance check circuit HTC, a saw tolerance check circuit STC, a compression tolerance check circuit CTC and a strand distribution tolerance check circuit DTC have been included in the data processing apparatus DPU in FIG. 4 between the output of the setpoint comparison circuits and the calculation section 270.

If the error difference from the setpoint comparison circuit exceeds the tolerance range permitted, the error difference is provided as an output from the tolerance check circuit to the calculation section CAL and a correction signal is supplied through the output multiplexer to the device being controlled. In addition, if the error difference from the setpoint comparison circuit exceeds the tolerance range provided, an output is also provided to a means for changing the scan rate for that control loop. Relays HOT, SOT COT, and BOT are responsive to predetermined differences between actual condition data on the input connections of the control loops and the desired condition data in the setpoint comparison circuits SCC, as determined by the tolerance check circuits HTC, STC, CTC, and DTC. Energization of the relays HOT, SOT, COT and DOT will close contacts in a scan rate control circuit SRC, as representatively shown to the right of the dotted line therein, to change circuits which have sensed that the tolerance has been exceeded from a slower scanning rate to a faster scanning rate until the condition or variable has been corrected.

When a job change or product change is introduced into the master program control MPC it is also desirable to automatically effect faster scan rates for the tolerance check circuits until the devices have reached the desired condition. A program change sensor PSC is responsive to the introduction of a different program or change in setpoint in the MPC and energizes a timing relay TMR when a program or setpoint change is sensed. The energization of the TMR relay will close TMR contacts in the scan rate control SRC, shown representatively to the left of the dotted line therein, to effect a faster scan rate for all of the variables being controlled for a predetermined length of time. The predetermined length of time will exceed the time normally required to make the correction and, as will be discussed in detail herinafter, is advantageously made proportional to the magnitude of the change in the setpoint for each of the variables being controlled.

It may thus be seen that if the data processing unit DPU in FIG. 4 has a variable scan algorithm included in the program, certain loops need be scanned at a fast scan rate only when a change or alarm condition exists and a slow scan rate when no control action is required. This utilizes less computer time and provides a more stable setting for the devices between changes. More computer time becomes available when there is no job change or alarm condition for the loops having a variable scan algorithm. The extra time input 239, the internal setpoint comparison section, calculation section, etc. of the data processing unit may then be utilized to control extra functions or do other tasks as represented by the extra functions block 300 receiving an output from the output multiplexer OM on lead 299.

It should be noted that in FIGS. 4, 5 and 6 and elsewhere in the drawings that the control functions have been illustrated by block diagrams which represent digital computer functions, analog computer components and the like in a combination which is intended to most clearly show the invention. Thus, one skilled in analog computer or process control could readily construct apparatus based upon the disclosure herein, while one skilled in the programming of digital computer apparatus would be able to readily prepare a program which would effect an interconnection of digital computer components in the order required to accomplish the functions set forth.

Referring to FIG. 5, one of the control loops from FIG. 4 has been selected in more detail. A hood wall HW is moved between desired positions by a mechanical linkage connecting the hood wall to the shaft SFT of a hood wall motor HWM, as shown in FIGS. 1 and 3. A hood wall motor control HWMC provides forward and reverse signals to the hood wall motor HWM in response to control signals from the hood correction storage unit HCS which has received an output signal from the data processing unit DPU.

The actual condition or position of the hood wall HW is monitored by a sensing unit such as a retransmitting slide wire unit APSW, with the movable tap on the slide wire being mechanically linked to the hood wall in a manner similar to that shown in FIG. 2. An actual position signal unit APS translates the signal from the sensor APSW into a data form suitable for feeding along input line 231 of the control loop to the data processing unit DPU. The hood scan relay contacts HSCN on input line 231 and output line 291 represent the contacts or other switching means in the input multiplexer IM and output multiplexer OM, respectively, shown in block diagram form in FIG. 4.

Data representing the desired position for the hood wall HW for a particular job is set into the setpoint programmer SPG, as by manually turning the adjustment knob SPGK on the programmer SPG. This provides setpoint data to the hood point setpoint comparison circuit HSC in FIG. 5. An input on lead 231 is provided to the hood setpoint comparison circuit HSC when the hood control loop is scanned by the closure of contacts HSCN.

If there is no difference between actual and setpoint data then there is no output from the comparison circuit. If a difference exists, an error signal is provided by the setpoint comparison circuit HSC to the hood tolerance comparison circuit HTC. The amount of tolerance permitted for the hood has been set into the hood tolerance comparison circuit HTC, for example by manually adjusting the knob HTCK. If the error signal from the comparison circuit HSC does not exceed the tolerance set into the circuit HTC there is no output from the hood tolerance comparison circuit.

In most control situations of this nature, the error signal, if smaller than the tolerance, may advantageously be fed to an error integrator of a reset function component ER, where successive small errors are added. In a manner known to those skilled in the art, the sum of the additive errors is added as a reset output to the proportional output on output lead 291.

when the error signal from the unit USC exceeds the tolerance range in unit HTC an output from the hood tolerance comparison circuit HTC will occur. An output in the circuit HTC will energize the hood out of tolerance relay HOT to change the scan rates as to be hereinafter described. Similarly, an output from the circuit HTC will be directed to the calculation section CAL in which a proportional correction signal will be provided and forwarded through the output multiplexer OM, as represented by the hood scan contacts HSCN and the output lead 291 to the hood correction storage unit HCS.

The input and output multiplexers IM and OM are also represented in FIG. 5 by the contacts IMLTX and OMLTX, respectively, to permit the use of the data processing unit DPU to take care of other control functions or to perform other tasks when the hood width control loop is on a slow scan rate.

Referring to FIG. 6 there is illustrated in block diagram and circuit form the means for effecting a change in scan rate for the loop illustrated in FIG. 5.

It will be noted that the circuit in FIG. 6 has been laid out in line diagram form. The components can be readily located by reference to the line number where the component is positioned. Contact switching operations may normally be noted without designating a mechanical tie between the contacts and the actuating means. The contacts may be located at any convenient position, even though quite remote from their actuating means. Cross reference between the actuating means and its associated contacts is accomplished by noting in the right hand margin of the drawing the reference character of the actuating means, for example the hood out of tolerance relay HOT, adjacent line 10, the line in which the contact actuating relay coil HOT is located for energization. Following the reference character, the line numbers in which HOT contacts appear are noted, i.e., 11, 12, 14, 17, 21.

A contact line number notation that is not underlined indicates that those contacts are normally open, as in lines 11, 14, 17, 21. A contact line number that is underlined indicates that those contacts are normally closed, i.e., as in line 12. Other actuating means and their associated contacts are similarly noted.

The hood tolerance comparison circuit HTC as shown in FIGS. 4 and 5 is located in line 10 of FIG. 6 and will provide an output from power lead L1 to power lead L2 when an error signal from the setpoint comparison circuit exceeds the tolerance range set into the circuit HTC. A program change sensor PSC as noted in FIGS. 4 and 5 is shown in line 13 of FIG. 6. As indicated in FIG. 5 the change of a setpoint may be sensed by mechanically linking the manual change knob SPGK with a tap on a retransmitting slide wires RTS in the program change sensor PSC. To provide an output from the power lead L1 to the power lead L2 which is proportional to the magnitude of the change in setpoint, the retransmitting slide wire RTS may be combined with the servo follower slide wire mechanism which will be energized when there is a change in position of the tap of the retransmitting slide wire RTS. The servo follower mechanism will remain energized until the servo follower has reached a point on the servo slide wire which balances the voltage conditions between the two slide wires within the program change sensor PSC. Other suitable means known to those skilled in the art may be utilized to sense the change in a program and to provide an output which is proportional in magnitude or in time to the magnitude of change of the setpoint involved.

For the purposes of clarity, a simple clock mechanisms CM1 and CM2 have been provided to actuate the hood scan relay HSCN. In a digital computer the multiplexers will be controlled by suitable program instructions. The clock driven wiper blades WB1 and WB2 of the clock mechanism, CM1 and CM2 are mechanically linked so that coordination in their rotation is attained. The wiper clock ring WCR1 has an inwardly extending wiper contact WC1 located at the 12 o'clock position. The wiper clock ring WCR2 has eight inwardly extending wiper contacts WC2 which are evenly spaced around the ring WCR2. The power lead L1 is connected to the outer rings WCR1 and WCR2. The wiper switch blades WB1 and WB2 are electrically connected through the hood scan relay energizing coil HSCN and through fast scan relay contacts FSR and the HSCN energizing coil, respectively.

Each time the wiper blade WB1 of the slow scan clock mechanism CM1 touches the wiper contact WC1 in each revolution, a short conduction of current is established through the relay HSCN causing it to close its contacts for scanning purposes. If the fast scan relay contacts FSR are closed in line 20 the touching of the wiper blade WB2 with the wiper contacts WC2 will produce eight pulses or current conductions through the hood scan relay coil HSCN in one revolution. Thus, the scanning rate for the hood control loop when the fast scan relay contact FSR are closed is eight times that of the slow scan rate.

In operation of the circuit of FIG. 6, when an error signal from the setpoint comparison circuits SCC exceeds the tolerance in comparison circuit HTC, the hood out of tolerance relay HOT in line 10 is energized. The out of tolerance contacts HOT in line 17 close, energizing the fast scan relay FSR through back contacts of the latching relay LR and timing relay TMR. The energization of the fast scan relay FSR closes front contacts FSR in line 20 to connect the fast scan mechanism CM2 to the hood scan relay HSCN to increase the scanning rate by eight times. The hood scan relay contact HSCNS in FIG. 5 in leads 231 and 291 close eight times as fast, permitting a faster scan of actual condition data and faster correction of position error until the hood wall HW is back into position within the tolerance.

When the hood wall HW is back in position within the tolerance allowed, the error signal is below the magnitude required to initiate an output from the tolerance comparison circuit HTC and the hood out of tolerance relay HOT is deenergized. Front contacts HOT in line 17 open to deenergize the fast scan relay FSR and place the slow scan mechanism CM1 in control of the hood scan relay HSCN.

To provide the operator an indication that the device being controlled by a particular loop is out of tolerance, hood out of tolerance front contacts HOT are provided in line 21 which, upon closure, energizes an alarm mechanism FA through the closed back contacts LR and TMR of the latching and timing relays respectively.

In order to change the scanning of the hood control loop from a slow to a fast scan rate when a program change is made, an output proportional to the magnitude of the change of the setpoint is provided by the program change sensor PSC in line 13. The timing relay TMR will stay energized for a length of time proportional to the magnitude of the change. Since the setpoint as provided to the setpoint comparison circuit SCC has also been changed, it is possible that the error signal from the hood width section of the setpoint comparison circuit SCC will exceed the tolerance set into the tolerance comparison circuit HTC. Thus the hood out of tolerance relay HOT in line 10 will also be energized.

The energization of the timing relay TMR will close front contacts in line 14 and, if the hood position is out of tolerance at this time, the HOT contacts in line 14 will also be closed enabling energization of the latch portion of the latching relay LR in lines 14, 15. Latching relay front contacts LR will close in line 16 and, through the now closed front contacts TMR of the timing relay, energization of the fast scan relay FSR in line 17 will occur. Front contacts FSR of the fast scan relay will then close in line 20 to put the hood width control loop on a faster scanning rate. This scanning rate will be maintained until the timing relay TMR is deenergized by the expiration of the signal issued from the program change sensor PSC. The timing relay contacts TMR will then open in line 16 to deenergize the fast scan relay and place the hood width control loop on slow scan again.

It is desirable to conserve computer time by pulling the hood width control loop out of the fast scan condition of the program change called for has been effected before the time has elapsed as determined by the output from the program sensing circuit PSC and the energization of the relay TMR. This early return to the slow scan rate has been provided for in the circuit of FIG. 6 by a counting unit CNTR in line 12 which counts the consecutive successive times that the hood width control loop is in tolerance. When the loop is out of tolerance, the out of tolerance relay HOT in line 10 will be energized as noted hereinbefore. Front contacts HOT will close in line 11 so that each time the hood scan relay contacts HSCN close in line 11, a reset signal for the counter CNTR is applied thereto. The counter is also prevented from counting when the control loop is out of tolerance, because the back contacts HOT in line 12 are opened when the out of tolerance relay HOT is energized.

Once the loop comes within tolerance, however, the out of tolerance relay HOT is deenergized opening front contacts HOT in line 11 to take away the resetting pulses applied to the counter CNTR, and closing back contacts HOT in line 12. Thus each time a hood scan relay HSCN is energized and its contacts HSCN closed in line 12, an "in tolerance" pulse is delivered from power lead L1 to the counter CNTR. After a predetermined number of scans in which the back contacts HOT remain closed, indicating that the control loop is within tolerance, an output is provided from the counter CNTR to energize the counter relay CTR. Back contacts CTR open in line 14 to inhibit application of latching current to the latch portion of the latching relay LR. Simultaneously front contacts CTR in line 15 close to apply releasing current to the release section of the latching relay LR to enable the latching relay contacts LR to be moved from latched to released position. Thus, front contacts LR open in line 16 to deenergize the fast scan relay FSR, even though the timing relay TMR is still energized in line 13 and has its front contacts TMR closed in line 16. Front contacts FSR in line 20 then open, removing the energization pulses from the fast scan mechanism CM2 to the scan relay HSCN and the control loop goes back on the normal slow scan rate.

There may be instances where the device being controlled cannot reach the desired position in the time provided by the output from the program change sensor PSC while the timing relay TMR is energized. If this condition occurs it is probable that a portion of the device being controlled has become inoperable or that there has been a failure somewhere in the control system. Therefore, it is desirable to take the control loop off of the fast scan rate, but to actuate an alarm to enable an operator to inspect the equipment to determine what has happened.

If the signal is removed from the timing relay TMR indicating that the timing period has elapsed, the timing relay contacts TMR in line 14 will open removing energization from the latch section of the latching relay LR, timing relay contacts TMR in line 16 will open deenergizing the fast scan relay FSR to place the unit on a slower scan rate. Back contacts TMR in line 17 will open to prevent the reenergization of the fast scan relay FSR through back contacts LR and the closed front contacts of the hood out of tolerance relay HOT, since the controlled device would still be out of tolerance.

The latching relay LR is still energized, however, until reset by the counter relay CTR. Thus, the latching relay contacts LR in line 22 are still closed and, when the timing period elapses and the back contacts TMR in line 22 close, the alarm SA is actuated notifying the operator that the elapsed time has expired without the controlled device attaining the desired position or condition.

When the failure has been corrected the hood tolerance comparison circuit HTC will no longer provide an output, thus deenergizing the hood out of tolerance relay HOT. The HOT contacts will open in line 11 to remove the reset pulses from the counter CNTR and the HOT back contacts in line 12 will close, permitting the counter CNTR to count successive scans in which the loop is within tolerance. After the requisite number of scans within tolerance, the counter relay CTR will be energized opening back contacts CTR in line 14 to inhibit application of a latching signal to the latch portion of the relay LR, while CTR front contacts in line 15 will close to apply a release current to the latching relay LR. Latching relay front contacts in line 22 will then open deactivating the alarm SA.

It is to be noted that the alarm FA in line 21 is inhibited from operation during the time when the alarm SA in line 22 is actuated. As noted above, when the alarm SA is actuated either or both of the latching relay LR and the timing relay TMR will be energized. Therefore, the alarm FA will be inhibited by the opening of back contacts LR of TMR.

If it is desired to have an alarm means actuated when the hood is out of tolerance for any reason, a switch OTS may be closed in line 23 so that closure of front contacts HOT in line 23 will actuate an alarm TA.

There has thus been disclosed herein a method of controlling a variable which includes the steps of sensing data representing the actual condition of the variable, scanning the sensed actual condition data, and comparing the actual condition data with data representing a desired condition for the variable. A first slower rate of scanning actual condition data is selected in response to substantial agreement between compared actual and desired condition data. A second faster rate of scanning actual condition data is selected in response to a predetermined difference between compared actual and desired condition data.

The method may further include the step of selecting the first slower scanning rate of actual condition data after the second faster rate of scanning in response to a predetermined plurality of consecutive indications of substantial agreement between actual and desired condition data by the comparing step. The method may also further include providing different setpoint data representing a different desired condition for the variable, selecting the second faster of scanning actual condition data in response to the provision of the different setpoint data, comparing the actual condition data and the different setpoint data just provided, and selecting the first slower rate of scanning actual condition data when there is substantial agreement between the actual condition data and the different setpoint.

When the method is applied to program a data processing apparatus such as a digital computer, the method of programming the digital computer with a scan algorithm for a control loop may include instructing the data processing apparatus to compare actual condition and desired condition data for a control loop for a variable being controlled. The data processing apparatus is further instructed to select a slower scanning rate for the control loop when the difference between compared actual and desired condition data for the control loop is too small to require correction of the actual condition of the variable. The data processing apparatus is further instructed to select a faster scanning rate when there is a difference between actual and desired condition data which requires correction of the actual condition of the variable. This method may further include instructing the data processing apparatus to select a faster scanning rate for the control loop in response to the introduction of different desired condition data for the variable being controlled into the control program for the variable.

The method has been shown specifically in this invention as applied to manufacturing a glass fiber mat. A fiber collection surface is moved past a fiber deposition station. Glass fibers are provided and deposited in a mat-like mass on the collecting surface as the surface moves past the deposition station. The mat-like mass of fibers is processed downstream from the deposition station to provide a finished glass fiber mat. The characteristics of the finished glass fiber mat are controlled by providing data on the actual condition of variables in depositing and processing the mat-like mass on the collecting surface. The actual condition data for each of the variables is scanned. The scanned actual condition data of each of the variables is compared with the desired condition data of each of the variables necessary to produce a finished glass fiber mat with predetermined characteristics. An actual condition of a variable is corrected when there is a difference between the actual condition data and the desired condition data for that variable.

The actual condition data for at least one of the variables of the mat manufacturing process is scanned at a first slower rate when the difference between the actual condition data and the desired condition data of that variable does not require correction of the actual condition of that variable. The actual condition data for this one variable is scanned at a second faster rate when the difference between actual condition data and desired condition data for that variable does require a correction of the actual condition of the variable involved. The actual condition data for the said one variable is scanned at a rate which is faster than the first slower scanning rate when a new and different set of desired condition data for the one variable is supplied for comparison with the actual condition data for that variable.

In conclusion, it is pointed out that while the illustrated examples constitute practical embodiments of my invention, I do not limit myself to the exact details shown, since modification of these details may be made without departing from the spirit and scope of this invention.

I claim:

1. Apparatus for controlling a variable, comprising
   a. control loop means for a variable including means for providing data on the actual condition of said variable; and
   b. data processing means including first means for scanning the actual condition data supplied by said control loop means at a plurality of different scanning rates, means for comparing the scanned actual condition data from said control loop means with data representing a desired condition for said variable, and second means responsive to a predetermined difference in the comparing means between actual and desired conditions of said variable for increasing the scanning rate of said first means of said control loop means from a first rate to a second rate which is faster than the said first scanning rate.

2. Apparatus as defined in claim 1 in which
   a. said data processing means further includes means responsive to said variable condition data comparing means for supplying variable correction data to said control loop means, and
   b. said second means is further responsive to a correction of said variable to a desired condition to decrease the scanning rate of said first means of said control loop means to a scanning rate which is slower than said second scanning rate.

3. Apparatus as defined in claim 1 in which
   a. said data processing means further includes means responsive to said variable condition data comparing means for supplying variable correction data to said control loop means, and
   b. said second means is further responsive to a predetermined plurality of consecutive indications of correction of said variable to a desired condition by said variable condition data comprising means to decrease the scanning rate of said first means of said control loop means to a scanning rate which is slower than said second scanning rate.

4. Apparatus as defined in claim 1 in which
   a. said data processing means further includes means responsive to said variable condition data compring means for supplying variable correction data to said control loop means, and which further includes
   b. timing means actuatable in response to the initiation of supplying of variable correction data to said control loop means,
   c. said second means being further responsive to said timing means after the elapse of a timing period to decrease the scanning rate of said first means from said second rate to a scanning rate which is slower than said second scanning rate.

5. Apparatus as defined in claim 4 in which
   a. said timing means further includes means for adjusting the length of said timing period,
   b. said timing adjusting means being responsive to said variable data comparing means for adjusting the length of the timing period to be proportional to the difference between the actual and desired conditions of said variable.

6. Apparatus as defined in claim 4 which further includes
   a. alarm means responsive to said timing means and said variable condition data comparing means,
   b. said alarm means being actuatable in response to a coincidence of the elapse of said timing period and a predetermined difference in said comparing means between actual and desired conditions of said variable.

7. Apparatus as defined in claim 1 which further includes
   a. means for changing the data in said comparing means representing the desired condition of said variable,
   b. said second means being further responsive to said data changing means to increase the scanning rate from said first rate to said second rate when desired condition data is changed.

8. Apparatus as defined in claim 7 which further includes
   a. timing means actuatable for a timing period in response to the changing of desired condition data in said comparing means,
   b. said second means being further responsive to said timing means after the elapse of said timing period to decrease the scanning rate of said first means from said second rate to a scanning rate which is slower than said second scanning rate.

9. Apparatus as defined in claim 8 in which said timing means further includes means responsive to the magnitude of said desired condition data change in said comparing means for adjusting the length of said timing period to be proportional to said magnitude.

10. Apparatus as defined in claim 8 which further includes alarm means actuatable in response to an elapse of a timing period of said timing means and a continuing predetermined difference in said comparing means between scanned actual condition data and the changed desired condition data.

11. Apparatus as defined in claim 10 which further includes second alarm means actuatable in response only to said predetermined difference in said comparing means between actual and desired conditions of said variable.

12. Apparatus as defined in claim 11 which further includes means for inhibiting operation of said second alarm means in response to actuation of said first-mentioned alarm means.

13. Apparatus as defined in claim 1 which further includes alarm means actuatable in response to said predetermined difference in said comparing means.

14. Apparatus for manufacturing a glass fiber mat, comprising a. a deposition station including means for providing glass fibers,
b. movable collecting surface means arranged to receive fibers at said deposition station,
c. means for depositing said glass fibers along said collecting surface including means for driving said movable collecting surface past said deposition station,
d. data processing means for controlling the variables of said glass fiber providing and depositing means to provide a mat-like mass of fibers on said collecting surface with predetermined uniform characteristics,
e. a plurality of control loops, each control loop providing data on the actual condition of each variable being monitored and controlled,
f. means for scanning the data provided by each control loop, said scanning means having a plurality of selectable different scanning rates,
g. said data processing means including means for comparing the scanned actual condition data of each control loop with setpoint data representing a desired condition for the variable of that loop, and
h. selecting means responsive to said comparing means for selecting a first slower scanning rate for at least one of said control loops in response to substantial agreement between actual and setpoint data for said one loop in said comparing means,
i. said selecting means being responsive to a predetermined difference in said comparing means between actual and setpoint data in said one control loop for selecting a second faster scanning rate of said scanning means for said one control loop.

15. Apparatus as defined in claim 14 in which said selecting means after the selection of said second faster scanning rate to a predetermined plurality of consecutive indications of correction of said variable controlled by said one control loop to a desired condition to select a slower scanning rate for said one control loop.

16. Apparatus as defined in claim 14 which further includes
a. means for changing the setpoint data for said one control loop in said comparing means,
b. said selecting means being further responsive to a change in setpoint data for said one control loop to select a faster scanning rate for said one control loop.

17. Apparatus as defined in claim 16 which further includes
a. timing means actuatable for a timing period in response to the changing of setpoint data for said one control loop,
b. said selecting means being further responsive to said timing means to select a slower scanning rate for said one control loop after the elapse of said timing period.

18. Apparatus as defined in claim 17 which further includes
a. alarm means responsive to the actuation of said timing means and to said comparing means,
b. said alarm means being actuatable to a coincidence of an actuation and elapse of a timing period and to the existence of said predetermined difference in said comparing means between actual and setpoint data.

19. Apparatus as defined in claim 17 which further includes means responsive to the magnitude of the change of said setpoint data for said one control loop for establishing a time for said timing period which is proportional to the magnitude of said setpoint change.

20. Apparatus as defined in claim 14 in which
a. said depositing means includes hood means interposed between said glass fiber providing means and said collecting surface means,
b. said hood means having adjustable side wall means for controlling the width of the mass of fibers deposited on said collecting surface means, and
c. means for adjusting the position of said side wall means,
d. said one control loop being connected to monitor the actual position of said side wall means and supply desired position control signals from said data processing means to said side wall adjusting means.

21. Apparatus as defined in claim 14 in which
a. said depositing means includes means for distributing said fibers back and forth across the width of said collecting surface means, and
b. means for adjusting the width of the sweep of said fiber distributing means,
c. said one control loop being connected to supply desired sweep with control signals to said means for adjusting the sweep of said fiber distributing means.

22. Apparatus as defined in claim 14 which further includes
a. downstream means for processing said mat-like mass of fibers on said movable collecting surface after said collecting surface has been moved past said deposition station,
b. a second of said plurality of control loops being connected to provide data on the actual condition of said downstream processing means,
c. said selecting means being responsive to said comparing means for selecting a first slower scanning rate for said second control loop in response to substantial agreement between actual and setpoint data for said downstream processing means,
d. said selecting means being responsive to a predetermined difference between actual and setpoint data in said comparing means for said downstream processing means for selecting a second faster scanning rate of said scanning means for said second control loop.

23. Apparatus for manufacturing a glass fiber mate, comprising
a. a deposition station including means for providing glass fibers,
b. collecting surface means movable past said deposition station to receive glass fibers thereon in a mat-like mass,
c. means dowkstream from said deposition station for processing said mat-like mass of fibers into a glass fiber mat,
d. data processing means for controlling the variables of said downstream processing means,
e. a plurality of control loops, each control loop providing data on the actual condition of each variable being monitored and controlled, f. means for scanning the data provided by each control loop, said scanning means having a plurality of selectable different scanning rates, g. said data processing means including means for comparing the scanned actual condition data of each control loop with setpoint data representing a desired condition for the variable of that loop, and h. selecting means responsive to said comparing means for selecting a first slower scanning rate for at least one of said control loops in response to substantial agreement between actual and setpoint data for said one loop in said comparing means, i. said selecting means being responsive to a predetermined difference in said comparing means between actual and setpoint data in said one control loop for selecting a second faster scanning rate of said scanning means for said one control loop.

24. A method of controlling a variable, comprising
a. sensing data representing the actual condition of said variable,
b. scanning said sensed actual condition data,
c. comparing said actual condition data with data representing a desired condition for said variable,
d. selecting a first slower rate of scanning actual condition data in response to substantial agreement between compared actual and desired condition data, and
e. selecting a second faster rate of scanning actual condition data in response to a predetermined difference between compared actual and desired condition data.

25. A method as defined in claim 24 which further includes the step of selecting said first slower rate of scanning actual condition data after said second faster rate of scanning in response to a predetermined plurality of consecutive indications of substantial agreement between actual and desired condition data by said comparing step.

26. A method as defined in claim 24 which further includes the steps of
a. providing different data representing a different desired condition for said variable,
b. selecting said second faster rate of scanning actual condition data in response to the provision of different desired condition data,
c. comparing said actual condition data and said different desired condition data, and
d. selecting said first slower rate of scanning actual condition data when there is substantial agreement between said actual condition data and said differential desired condition data.

27. A method for manufacturing a glass fiber mat including the steps of
a. moving a fiber collecting surface past a fiber deposition station;
b. providing and depositing glass fibers in a mat-like mass on said collecting surface as said surface moves past said deposition station;
c. processing said mat-like mass of fibers downstream from said deposition station to provide a finished glass fiber mat;
d. controlling the characteristics of the finished glass fiber mat by providing data on the actual condition of variables in depositing and processing said mat-like mass on said collecting surface, scanning said actual condition data for each of said variables, comparing the scanned actual condition data of each of said variables with the desired condition data of each of said variables necessary to produce a finished glass fiber mat with predetermined characteristics, and correcting an actual condition of a variable when there is a difference in the actual condition data and the desired condition data for that variable; and
e. scanning the actual condition data for at least one of said variables at a first slower rate when the difference between actual condition data and desired condition data of that variable does not require a correction of the actual condition of that variable; and
f. scanning the actual condition data for said one variable at a second faster rate when the difference between actual condition data and desired condition data for that variable requires a correction of the actual condition of that variable.

28. A method as defined in claim 27 which includes the step of scanning the actual condition data for said one variable at a rate which is faster than said first slower scanning rate when a new and different set of desired condition data for that variable is supplied for comparison with actual condition data for that variable.

* * * * *